UNITED STATES PATENT OFFICE.

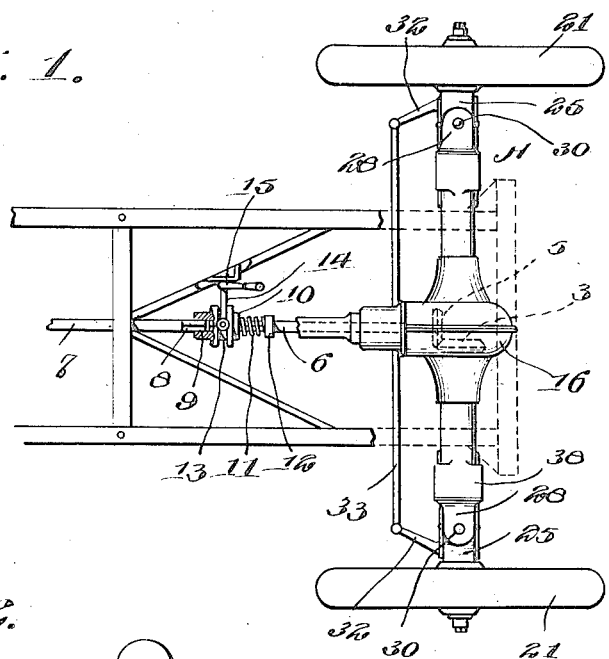
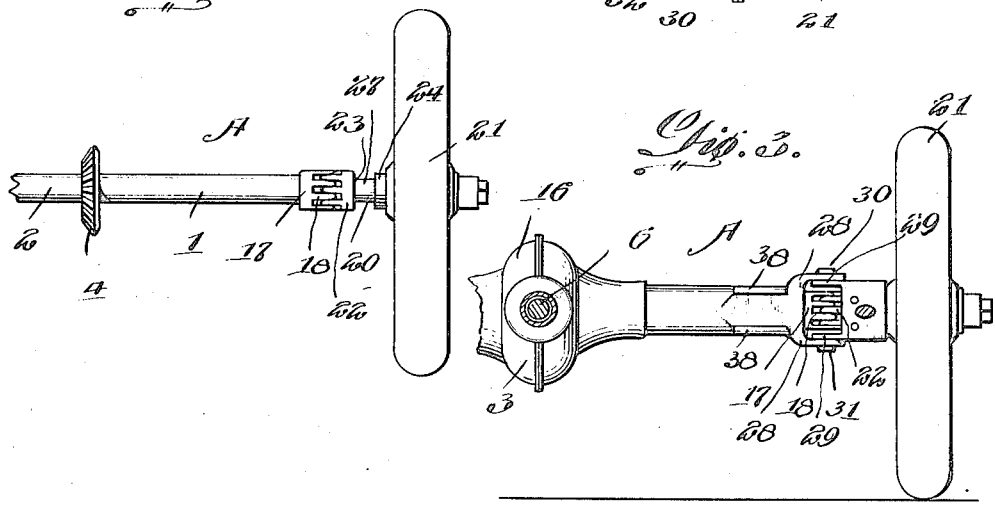

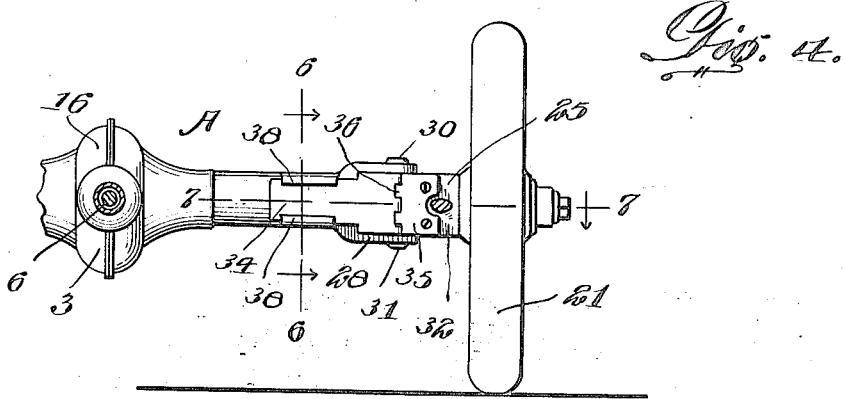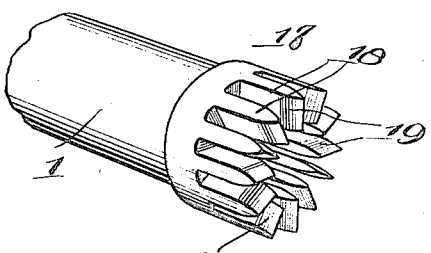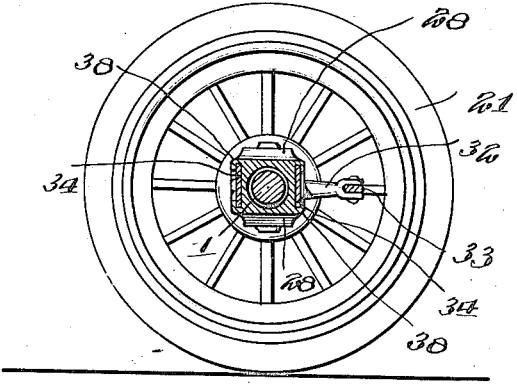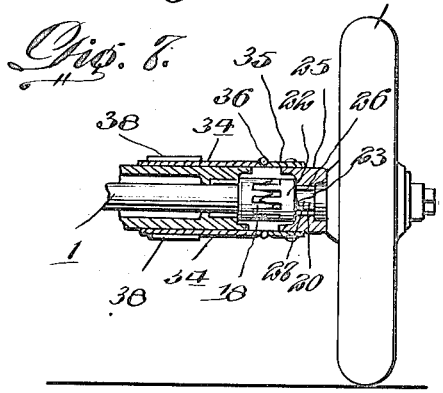

WILLIE W. NELSON AND LEE McDONAL, OF MONTICELLO, MISSISSIPPI; SAID McDONAL ASSIGNOR OF HIS ENTIRE RIGHT TO WALTER W. WEATHERSBY, OF BROOKHAVEN, MISSISSIPPI.

FRONT-WHEEL DRIVE.

1,222,449.   Specification of Letters Patent.   Patented Apr. 10, 1917.

Application filed August 9, 1916.   Serial No. 114,016.

*To all whom it may concern:*

Be it known that we, WILLIE W. NELSON and LEE McDONAL, citizens of the United States, residing at Monticello, in the county of Lawrence and State of Mississippi, have invented new and useful Improvements in Front-Wheel Drives, of which the following is a specification.

This invention relates to front wheel driving mechanism for motor vehicles such as automobiles, motor trucks and the like, the object in view being to produce simple driving connections between the engine and the front steering wheels of the machine, whereby the power of the engine may be transmitted to the front wheels as well as the rear wheels of the machine without interfering with the turning of the front wheels for steering purposes.

A further object in view is to provide means for housing in certain members of the driving connections between the engine and the front wheels in order to exclude foreign matter to prevent wear of the parts and to reduce friction to a minimum.

With the above and other objects in view, the invention consists in the novel construction, combination and arrangement of parts, as herein described, illustrated and claimed.

In the accompanying drawings:—

Figure 1 is a plan view of a sufficient portion of the chassis of a motor vehicle to illustrate the present invention in its applied relation thereto.

Fig. 2 is a fragmentary plan view of the front axle.

Fig. 3 is a fragmentary rear elevation of the front axle housing with the gear housing plates removed.

Fig. 4 is a view similar to Fig. 3 showing one of the gear housing plates in position.

Fig. 5 is a perspective view illustrating one of the gear faces of the front axle.

Fig. 6 is a fragmentary section on the line 6—6 of Fig. 4.

Fig. 7 is a fragmentary section on the line 7—7 of Fig. 4.

Referring to the drawings A designates generally the front axle which is mounted to rotate in suitable bearings, said axle being divided between the ends thereof into two sections 1 and 2 which are connected by means of differential gearing 3 similar to that used at the present time in connection with the rear driving axle of an automobile or motor truck. 4 designates the master gear of the differential and 5 the main driving pinion on the front end of a forwardly extending drive shaft 6 which is adapted to be connected to and disconnected from a constantly driven shaft 7 actuated by the motor and having a squared end portion 8 which is receivable in the correspondingly shaped bore 9 of a coupling 10 which is slidable on the shaft 6 and which is normally maintained in engagement with the shaft 7 by means of a coiled expansion spring 11 which is interposed between a fixed collar 12 on the shaft 6 and the slidable coupling 10.

The coupling 10 is formed with a groove 13 to receive the forked end 14 of a shifting lever 15 which will preferably extend upwardly through an opening in the floor of the machine to a point within easy reach of the operator in his seat who may thereby throw the coupling 10 into and out of engagement with the shaft 8. This provides for throwing the front wheels out of driving gear when found advisable as on level stretches or down grades, the shaft 6 being thrown into operation ordinarily when ascending steep grades so as to obtain the additional traction of the front wheels. 16 designates the housing for the front differential gearing.

Each of the shaft sections 1 and 2 is provided at its outer end with a gear face 17 having extra long teeth 18 terminating in beveled extremities 19. The bevel of the extremities of the teeth is of sufficient length to enable two gear faces when combined to have a rocking relation to each other so as to produce a connection somewhat resembling a universal joint. The spindle 20 on which each of the steering wheels 21 is fixedly mounted is provided at its inner end with a gear face 22 the counterpart of the gear face 17 above described. The rear end of the gear face 22 provides an annular shoulder 23 and the inner end of the spindle 20 is enlarged to form another shoulder 24 in spaced relation to the shoulder 23. Each of the steering knuckles 25 is provided with a central bore or bearing 26 to receive the journal portion 27 of the spindles 20, the journal portion 27 lying between the shoulders 23 and 24 and the latter abutting against the inner and outer faces of the body 25 of the steering knuckle so as to prevent longitudinal movement of the spindle 20.

The outer extremities of the axle sections 1 and 2 are provided with upper and lower fork arms 28 while the steering knuckle is correspondingly provided with upper and lower arms 29. The upper arms 28 and 29 are connected together by a pivot 30 and the lower arms are connected together by another pivot 31 shown as arranged in vertical alinement with the pivot 30. Both of said pivots are of course in axial alinement with each other to admit of the free turning movement of the steering knuckle 25. Each of the knuckles 25 is provided with the usual operating arm 32, said arms being coupled together by the usual connecting rod 33 forming an element of the ordinary steering mechanism now in common use.

The arms 28 and 29 are of sufficient width to cover the upper and lower sides of the gear faces 17 and 22. The front and rear faces thereof are inclosed and protected by means of housing plates each of which comprises an inner section 34 and an outer section 35, said sections being hinged together as shown at 36. The inner section 34 is slidable to a limited extent longitudinally of the front axle housing between parallel guides 38 formed on said housings as best shown in Figs. 4 and 6, the outer housing plate section 35 being fastened to the body of the knuckle 25 by any convenient or suitable means.

By forming the teeth of the gear faces 17 and 22 in the manner illustrated and described, the spindles 20 may be rocked into angular relation to the sections of the driving axle A by means of the steering connections, without interfering with the driving relation between said gear faces so that both of the spindles 20 with the wheels 21 fast thereon are driven positively irrespective of the angles assumed by the steering wheels under the control of the driver. The hinged sections of the housing plates admit of such swinging movement of the spindles 20 without admitting dust, dirt and other foreign matter to the coöperating gear faces thus maintaining the latter in good working condition.

We claim:—

In front wheel driving mechanism for motor vehicles, a rotary front axle, a front axle housing, steering knuckles pivotally connected to the opposite ends of said housing, wheel spindles journaled in said knuckles and having steering wheels fast thereon, driving means between said axle and spindles, means to admit of the spindles being rocked at an angle to the front axle without disturbing the driving relation between said axle and spindles, and front and rear housing plates for inclosing said driving means, each of said housing plates embodying sections hinged together, one section having a fixed relation to the steering knuckle and the other section having a sliding relation to the front axle housing.

In testimony whereof we affix our signatures.

WILLIE W. NELSON.
LEE McDONAL.